(12) United States Patent
Takeuchi

(10) Patent No.: US 10,544,336 B2
(45) Date of Patent: Jan. 28, 2020

(54) COMPOSITION FOR PRESSURE-SENSITIVE ADHESIVE, PRESSURE-SENSITIVE ADHESIVE RESIN TAPE, AND WIRE HARNESS

(71) Applicant: Yazaki Corporation, Minato-ku, Tokyo (JP)

(72) Inventor: Kazuya Takeuchi, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/954,031

(22) Filed: Apr. 16, 2018

(65) Prior Publication Data

US 2018/0298245 A1 Oct. 18, 2018

(30) Foreign Application Priority Data

Apr. 17, 2017 (JP) .................................. 2017-081492

(51) Int. Cl.
*C09J 109/00* (2006.01)
*C09J 109/06* (2006.01)
(Continued)

(52) U.S. Cl.
CPC ............ *C09J 107/02* (2013.01); *C08K 5/0016* (2013.01); *C08K 5/101* (2013.01); *C08K 5/103* (2013.01); *C09J 7/245* (2018.01); *C09J 7/383* (2018.01); *C09J 109/00* (2013.01); *C09J 109/06* (2013.01); *C09J 113/02* (2013.01); *C09J 153/02* (2013.01); *C09J 2201/122* (2013.01); *C09J 2201/606* (2013.01); *C09J 2203/302* (2013.01); *C09J 2205/102* (2013.01); *C09J 2407/00* (2013.01); *C09J 2409/00* (2013.01);
(Continued)

(58) Field of Classification Search
None
See application file for complete search history.

(56) References Cited

U.S. PATENT DOCUMENTS 6,552,118 B2 * 4/2003 Fujita ..................... C08F 8/42
106/287.1
2005/0209380 A1 * 9/2005 Wada ..................... C09J 133/04
524/270
(Continued)

FOREIGN PATENT DOCUMENTS

| JP | S 63-275685 A | 11/1988 |
| JP | H08-325534 A | 12/1996 |

(Continued)

OTHER PUBLICATIONS

Kuraray_LIR700_Liquid_Rubber (Year: 2017).*
(Continued)

*Primary Examiner* — Frank D Ducheneaux
(74) *Attorney, Agent, or Firm* — Banner & Witcoff, Ltd.

(57) ABSTRACT

The present invention relates to a composition for a pressure-sensitive adhesive comprising 100 parts by mass (non-volatile fraction) of a main agent comprising a mixture of a natural rubber latex and a synthetic rubber latex, 40 to 120 parts by mass of a rosin-based tackifier resin having a softening point of 130 to 135° C. and 1 to 15 parts by mass of low-molecular-weight polyisoprene having a weight-average molecular weight of 15,000 to 40,000.

5 Claims, 1 Drawing Sheet

(51) Int. Cl.
| | |
|---|---|
| *C09J 109/08* | (2006.01) |
| *C09J 153/02* | (2006.01) |
| *C09J 7/24* | (2018.01) |
| *C09J 7/38* | (2018.01) |
| *C09J 125/10* | (2006.01) |
| *C08K 5/101* | (2006.01) |
| *C08K 5/103* | (2006.01) |
| *C09J 107/02* | (2006.01) |
| *C09J 113/02* | (2006.01) |
| *C08K 5/00* | (2006.01) |

(52) U.S. Cl.
CPC ........ *C09J 2413/00* (2013.01); *C09J 2425/00* (2013.01); *C09J 2427/006* (2013.01)

(56) References Cited

U.S. PATENT DOCUMENTS

2009/0252958 A1* 10/2009 Nishijima ................ C09J 7/245
428/355 BL
2011/0020643 A1* 1/2011 Endo ...................... C09J 115/00
428/355 BL

FOREIGN PATENT DOCUMENTS

| JP | H10-140118 A | 5/1998 |
| JP | H10-226771 A | 8/1998 |
| JP | 2004-143248 A | 5/2004 |
| JP | 2012-007027 A | 1/2012 |

OTHER PUBLICATIONS

Mar. 5, 2019—(JP) Information Offer Form—App 2017-081492.
"Adhesive Handbook, 3rd Edition", published on Oct. 1, 2005, lines 7-10 on p. 323, partion English translation.

"Development Status of Rosin-Based TAckifier", pp. 63-67, Japan Energy & Technology Intelligence (JETI), vol. 64, No. 3, published Mar. 16, 2016.

* cited by examiner

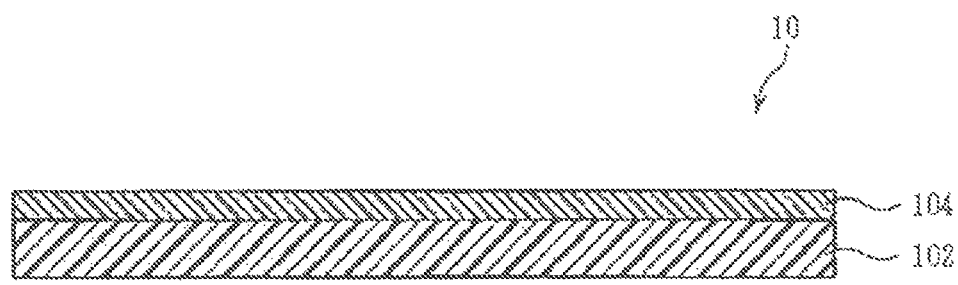

COMPOSITION FOR PRESSURE-SENSITIVE ADHESIVE, PRESSURE-SENSITIVE ADHESIVE RESIN TAPE, AND WIRE HARNESS

CROSS REFERENCES TO RELATED APPLICATIONS

This application is based on Japanese Patent Application (No. 2017-081492) filed on Apr. 17, 2017, the contents of which are incorporated herein by reference.

BACKGROUND OF THE INVENTION

1. Field of the Invention

The present invention relates to a composition for a pressure-sensitive adhesive, a pressure-sensitive adhesive resin tape, and a wire harness.

For the purpose of bundling and protecting electric wires for an automobile, a polyvinyl chloride resin tape (hereinafter also simply referred to as "tape") has been used. The polyvinyl chloride resin tape basically comprises a pressure-sensitive adhesive layer and a polyvinyl chloride resin substrate. The pressure-sensitive adhesive layer includes a composition wherein a rubber, which is generally used as a main agent, a tackifier resin such as a rosin ester resin, a terpene resin, or an aliphatic or aromatic hydrocarbon resin, a softening agent such as low-molecular weight isoprene rubber (IR), or polyisobutylene, and an antioxidant such as a phenol-based antioxidant are blended. Because a plasticizer may bleed from the polyvinyl chloride resin substrate in such a conventional tape, paste thickness, i.e. thickness of the pressure-sensitive adhesive layer, is made large for maintaining its adhesiveness. However, during storage, the large paste thickness may cause a telescope phenomenon, which means a center of a wound tape rises up and the tape deforms into a bowl shape, and may cause the tape to become sticky due to a paste protrusion ("paste" means a pressure-sensitive adhesive) from the side of the tape.

2. Description of the Related Art

JP-A-10-226771 discloses a PVC (polyvinyl chloride resin) pressure-sensitive adhesive tape comprising a pressure-sensitive adhesive supported on a tape substrate composed of a resin composition containing a polyvinyl chloride resin as a main component, wherein the pressure-sensitive adhesive is composed of a copolymer of 2-ethylhexyl acrylate and at least one monomer selected from the group consisting of styrene, acrylonitrile, and butyl acrylate.

SUMMARY OF THE INVENTION

Although the PVC pressure-sensitive adhesive tape described in JP-A-10-226771 was effective for solving the above problems of the telescope phenomenon and stickiness, the tape was not versatile due to the use of an acrylic polymer which is expensive as a pressure-sensitive adhesive.

Accordingly, the present invention is devised in consideration of the aforementioned circumstances and an object thereof is to provide a composition for a pressure-sensitive adhesive, a pressure-sensitive adhesive resin tape, and a wire harness, which are low-cost, are less prone to cause the telescope phenomenon and the paste protrusion from the side of the tape, and have excellent adhesive strength.

For achieving the aforementioned object, the "composition for a pressure-sensitive adhesive, pressure-sensitive adhesive resin tape, and wire harness" according to the present invention are characterized by the following (1) to (5).

(1) A composition for a pressure-sensitive adhesive, comprising 100 parts by mass (non-volatile fraction) of a main agent comprising a mixture of a natural rubber latex and a synthetic rubber latex, 40 to 120 parts by mass of a rosin-based tackifier resin having a softening point of 130 to 135° C. and 1 to 15 parts by mass of low-molecular-weight polyisoprene having a weight-average molecular weight of 15,000 to 40,000.

(2) A pressure-sensitive adhesive resin tape comprising a pressure-sensitive adhesive layer and a resin substrate, wherein the pressure-sensitive adhesive layer comprises the composition for a pressure-sensitive adhesive according to (1).

(3) The pressure-sensitive adhesive resin tape according to (2), wherein the resin substrate comprises a polyvinyl chloride resin.

(4) The pressure-sensitive adhesive resin tape according to (2) or (3), wherein the pressure-sensitive adhesive layer has a thickness of 5 μm to 20 μm.

(5) A wire harness comprises the pressure-sensitive adhesive resin tape according to any one of (2) to (4).

The composition for the pressure-sensitive adhesive, as described in the above (1), comprises 100 parts by mass (non-volatile fraction) of a main agent comprising a mixture of a natural rubber latex and a synthetic rubber latex, 40 to 120 parts by mass of a rosin-based tackifier resin having a softening point of 130 to 135° C. and 1 to 15 parts by mass of low-molecular-weight polyisoprene having a weight-average molecular weight of 15,000 to 40,000. The use of the mixture of a natural rubber latex and a synthetic rubber latex as a main agent, instead of an acrylic polymer, which is expensive, reduces cost of the composition. Moreover, suitably setting the ranges of the softening point and the amount of the rosin-based tackifier resin and suitably setting the ranges of the weight-average-molecular weight and the amount of the polyisoprene prevent the telescope phenomenon and the paste protrusion from the side of the tape, and lead to excellent adhesive strength.

Therefore, the composition for a pressure-sensitive adhesive according to the present invention is less prone to cause the telescope phenomenon and the paste protrusion from the side of the tape, and has excellent adhesive strength.

Regarding the pressure-sensitive adhesive tape described in the above (2), the pressure-sensitive adhesive composition of the above (1) is used for the pressure-sensitive adhesive layer. Thus, the pressure-sensitive adhesive tape described in the above (2) is less prone to cause the telescope phenomenon and the paste protrusion from the side of the tape, and has excellent adhesive strength.

Regarding to the pressure-sensitive adhesive tape of the above (3), a polyvinyl chloride resin is contained in the resin substrate. Thus, the pressure-sensitive adhesive tape is less prone to cause the telescope phenomenon and the paste protrusion from the side of the tape, has excellent adhesive strength, and particularly, the pressure-sensitive adhesive tape is useful for a wire harness.

Regarding to the pressure-sensitive adhesive tape of the above (4), the pressure-sensitive adhesive layer has a thickness of 5 μm to 20 μm. By setting the thickness of the pressure-sensitive adhesive layer at such a range, the tape becomes advantageous in view of adhesive strength and holding force.

Regarding the wire harness of the above (5), the pressure-sensitive adhesive tape according to any one of the above (2) to (4), which comprises the pressure-sensitive adhesive composition of the above (1) in the pressure-sensitive adhesive layer, is used for the wire harness. Therefore, it is possible to provide a wire harness which is less prone to cause the telescope phenomenon and the paste protrusion from the side of the tape and is also excellent in adhesive strength.

Based on the present invention, a composition for a pressure-sensitive adhesive, a pressure-sensitive adhesive resin tape, and a wire harness can be provided, which are low-cost, are less prone to cause the telescope phenomenon and the paste protrusion from the side of the tape, and have excellent adhesive strength.

In the above, the invention is briefly described. Moreover, the detail of the invention will be further clarified by reading through the modes for carrying out the invention (hereinafter referred to as "embodiment(s)") to be described below with reference to the attached drawing.

BRIEF DESCRIPTION OF THE DRAWINGS

FIG. 1 is a cross-sectional view of one embodiment of the pressure-sensitive adhesive resin tape of the present invention.

DESCRIPTION OF REFERENCE NUMERALS AND SIGNS

10 Pressure-sensitive adhesive resin tape
102 Resin substrate
104 Pressure-sensitive adhesive layer

DETAILED DESCRIPTION OF THE EXEMPLARY EMBODIMENTS

The following will describe embodiments of the composition for a pressure-sensitive adhesive, pressure-sensitive adhesive resin tape, and wire harness according to the present invention.
(Composition for Pressure-Sensitive Adhesive)

The composition for a pressure-sensitive adhesive comprises 100 parts by mass (non-volatile fraction) of a main agent comprising a mixture of a natural rubber latex and a synthetic rubber latex, 40 to 120 parts by mass of a rosin-based tackifier resin having a softening point of 130 to 135° C. and 1 to 15 parts by mass of low-molecular-weight polyisoprene having a weight-average molecular weight of 15,000 to 40,000.
(Main Agent)

The main agent of the composition for a pressure-sensitive adhesive according to the present invention comprises a mixture of a natural rubber latex and a synthetic rubber latex.

The natural rubber latex includes any known ones conventionally used in compositions for a pressure-sensitive adhesive and one subjected to depolymerization without limitation. Also, the natural rubber latex may be a modified natural rubber latex or may be an unmodified natural rubber latex. For increasing unwinding force (force required to unwind tape in a wound state) to improve binding workability (efficiency when bundling up cables and the like with tape), an acryl-modified natural rubber latex can be used. The acryl-modified natural rubber latex includes any known ones conventionally used in compositions for a pressure-sensitive adhesive without limitation. From the viewpoints of enhancing the advantages of the invention, preferred is a combination of the unmodified natural rubber latex and the acryl-modified natural rubber latex. In this case, the ratio of the former to the latter (mass ratio of non-volatile fractions) is preferably 20:80 to 80:20, particularly preferably 40:60 to 60:40.

The synthetic rubber latex includes a styrene-butadiene copolymer latex, a chloroprene latex, an acrylic ester copolymer latex, an acryl-butadiene copolymer latex, a styrene-isoprene latex, and these synthetic rubber latexes may be acid-modified (e.g., a carboxy-modified one). From the viewpoint of enhancing the pressure-sensitive adhesive force, a styrene-butadiene copolymer latex is preferred.

In the main agent of the composition for a pressure-sensitive adhesive according to the present invention, the ratio of the natural rubber latex to the synthetic rubber latex (mass ratio of non-volatile fractions) is, from the viewpoints of good adhesive strength and costs, preferably 10:90 to 90:10, further preferably 20:80 to 80:20, particularly preferably 30:70 to 70:30.

Incidentally, the non-volatile fraction in the present invention is defined as a mass which is measured in accordance with JIS K6387 (2011) as setting a drying temperature to 135° C.

In the composition for a pressure-sensitive adhesive according to the present invention, the ratio of the main agent to the whole composition for a pressure-sensitive adhesive is, for example, 25 to 45% by mass, preferably 30 to 40% by mass. Moreover, the non-volatile fraction in the main agent is usually 30 to 70% by mass, preferably 40 to 60% by mass.

Incidentally, the above natural rubber latex and synthetic rubber latex which are known and commercially available can be appropriately used.
(Rosin-Based Tackifier Resin)

Any rosin-based tackifier resin can be used for the present invention without limitation as long as it has a softening point of 130 to 135° C., but a rosin ester resin having a relatively high softening point is suitable. Specifically, the rosin-based tackifier resin to be used in the present invention is suitably a rosin ester resin having a softening point of 130 to 135° C.

The rosin ester resin is obtained by the esterification reaction of a rosin with an alcohol.

The rosin includes raw material rosins such as gum rosin, wood rosin, and tall oil resin, stabilized rosins obtained by disproportionation or hydrogenation treatment of the above raw material rosins, and polymerized rosins. Moreover, the alcohol includes but not particularly limited to known ones such as monohydric alcohols and polyhydric alcohols.

Incidentally, the softening point in the present invention is a temperature measured in accordance with JIS K5902 (2006).

When the softening point of the rosin-based tackifier resin is lower than 130° C., the adhesive strength may decrease and the telescope phenomenon may occur in the pressure sensitive adhesive tape. Contrarily, when the softening point exceeds 135° C., the adhesive strength is not generated and thus the tape cannot be wound. The method for controlling the softening point within the above range includes but not limited to changing the ratio of the acid modification treatment to the rosin-based tackifier resin.

Furthermore, in the present invention, it is preferred not to use another tackifier resin having a softening point outside the range of 130 to 135° C. When the other tackifier resin having a softening point outside the range of 130 to 135° C.

is used, the adhesive strength may decrease and the telescope phenomenon may occur.

The rosin-based rosin-based tackifying resin having a softening point of 130 to 135° C. is blended in an amount of 40 to 120 parts by mass relative to 100 parts by mass of the main agent comprising the mixture of the natural rubber latex and the synthetic rubber latex. When the blending amount is less than 40 parts by mass, the adhesive strength may decrease and when the amount exceeds 120 parts by mass, the adhesive strength may decrease and the telescope phenomenon may occur.

The blending amount of the rosin-based rosin-based tackifying resin having a softening point of 130 to 135° C. is preferably 60 to 100 parts by mass relative to 100 parts by mass (non-volatile mass) of the main agent comprising the mixture of the natural rubber latex and the synthetic rubber latex.

Incidentally, the rosin-based tackifier resin which is known and commercially available can be appropriately utilized.

(Low-Molecular-Weight Polyisoprene)

The low-molecular-weight polyisoprene to be used in the present invention has a weight-average molecular weight of 15,000 to 40,000. When the weight-average molecular weight is less than 15,000, the adhesive strength may decrease, and when the weight-average molecular weight exceeds 40,000, the adhesive strength cannot be generated and thus the product cannot be wound into a roll.

The weight-average molecular weight of the low-molecular-weight polyisoprene is preferably 20,000 to 35,000. The weight-average molecular weight is measured by a GPC method.

The low-molecular-weight polyisoprene to be used in the present invention has a function as a softening agent.

The low-molecular-weight polyisoprene is blended in an amount of 1 to 15 parts by mass relative to 100 parts by mass (non-volatile fraction) of the main agent comprising the mixture of the natural rubber latex and the synthetic rubber latex. When the blending amount is less than 1 part by mass, the adhesive strength cannot be generated and thus the product cannot be wound into a roll and when the amount exceeds 15 parts by mass, the adhesive strength may decrease and the telescope phenomenon may occur.

The blending amount of the low-molecular-weight polyisoprene is preferably 1 to 10 parts by mass, further preferably 3 to 7 parts by mass relative to 100 parts by mass (non-volatile fraction) of the main agent comprising the mixture of the natural rubber latex and the synthetic rubber latex.

Incidentally, the above low-molecular-weight polyisoprene which is known and commercially available can be appropriately utilized.

The composition for a pressure-sensitive adhesive of the invention can be prepared by adding the rosin-based tackifier resin having a softening point of 130 to 135° C. and the low-molecular-weight polyisoprene having a weight-average molecular weight of 15,000 to 40,000 in the defined ranges to the main agent comprising the mixture of the natural rubber latex and the synthetic rubber latex and mixing them according to a conventional method.

Incidentally, at the time of the above addition and mixing, it is preferred to add and mix an aqueous emulsion of the rosin-based tackifier resin having a softening point of 130 to 135° C. and the low-molecular-weight polyisoprene having a weight-average molecular weight of 15,000 to 40,000. Since it is possible to emulsify an aqueous emulsion in water, dissolution in an organic solvent is not necessary.

Therefore, in the case where the composition for a pressure-sensitive adhesive of the invention is, for example, used in vehicle applications, the use of an organic solvent is unnecessary, so that it is preferred from the viewpoint of coping with volatile organic compounds (VOC). The non-volatile fraction of the above aqueous emulsion is, for example, 40 to 60% by mass.

Moreover, into the composition for a pressure-sensitive adhesive according to the present invention, in addition to the above components, known additives can be blended as needed. For example, the addition of 0.5 to 3 parts by mass of a hindered phenol-based emulsion, which is an aging inhibitor, provides the composition for a pressure-sensitive adhesive with excellent performance balance of satisfying properties conventionally required for a tape as well as the effect of the present invention.

(Pressure-Sensitive Adhesive Resin Tape)

Next, the pressure-sensitive adhesive resin tape of the invention will be described.

FIG. 1 is a cross-sectional view of one embodiment of the pressure-sensitive adhesive resin tape of the present invention.

In FIG. 1, the pressure-sensitive adhesive resin tape 10 according to an embodiment of the present invention comprises a resin substrate 102 and a pressure-sensitive adhesive layer 104 provided thereon, wherein the pressure-sensitive adhesive layer 104 is formed of the composition for a pressure-sensitive adhesive according to the present invention.

Various materials can be appropriately selected and used for the resin substrate 102 depending on various applications. Examples thereof include polyolefins such as low density polyethylene, linear polyethylene, medium density polyethylene, high density polyethylene, ultra-low density polyethylene, random-copolymerized polypropylene, block-copolymerized polypropylene, homopolypropylene, polybutene, and polymethylpentene, ethylene-vinyl acetate copolymers, ionomer resins, ethylene-(meth)acrylic acid copolymers, ethylene-(meth)acrylate ester (random or alternate) copolymers, ethylene-butene copolymers, ethylene-hexene copolymers, polyurethanes, polyesters such as polyethylene terephthalate and polyethylene naphthalate, polycarbonates, polyimides, polyether ether ketones, polyether imides, polyamides, wholly aromatic polyamides, polyphenyl sulfide, aramide (paper), glass, glass cloths, fluororesins, polyvinyl chloride resins, polyvinylidene chloride resins, cellulose-based resins, silicone resins, metal (foil), and paper.

The pressure-sensitive adhesive layer 104 can be provided on the resin substrate 102 by any known method. For example, the layer can be formed by applying the composition for a pressure-sensitive adhesive on the resin substrate 102 with any of various coater and then drying the composition. Alternatively, the layer can be provided by forming the pressure-sensitive adhesive layer on a separator and then transferring the layer onto the resin substrate 102.

The thickness of the resin substrate 102 is, for example, about 20 to 200 μm, preferably 50 to 100 μm, and the thickness of the pressure-sensitive adhesive layer 104 is, for example, about 5 to 25 μm.

Incidentally, the pressure-sensitive adhesive resin tape 10 according to an embodiment of the present invention can have another layer in addition to the resin substrate 102 and the pressure-sensitive adhesive layer 104, as needed. For example, a known undercoat layer can be disposed between the resin substrate 102 and the pressure-sensitive adhesive layer 104. This can enhance the adhesiveness of the pressure-sensitive adhesive layer 104 to the resin substrate 102.

The pressure-sensitive adhesive resin tape 10 according to an embodiment of the present invention can be, for example, suitably used for a wire harness for an automobile. A wire harness is an assembly of various components, such as electric wires, cable ties, pressure-sensitive adhesive tape, connectors and terminals, and it can be used for various machines, such as automobiles and computers. The pressure-sensitive adhesive resin tape 10 can be used for bundling the wire harness or fixing a protective member for a wire harness to the wire harness, and the tape can be used so as to be wound around a position to be bundled or a position to be fixed.

In the case where the pressure-sensitive adhesive resin tape 10 is used for the wire harness, the resin substrate 102 preferably contains a polyvinyl chloride resin. Examples of the polyvinyl chloride resin include a soft polyvinyl chloride resin. Such a resin substrate 102 is formed of a polyvinyl chloride resin composition.

In the above polyvinyl chloride resin composition, the ratio of the polyvinyl chloride resin is, for example, 30 to 70% by mass, preferably 40 to 70% by mass, further preferably 50 to 70% by mass. Into the polyvinyl chloride resin composition, various known additives can be blended as needed. Examples thereof include pigments, stabilizers and plasticizers.

In the case where the pressure-sensitive adhesive resin tape 10 is used for the wire harness, the thickness of the resin substrate 102 is, for example, 0.05 mm to 0.20 mm, preferably 0.06 mm to 0.15 mm. When the thickness of the resin substrate 102 is less than 0.05 mm, the tape may be prone to be cut off and may be poor in workability. Contrarily, when the thickness of the resin substrate 102 exceeds 0.20 mm, flexibility of the tape may decrease and thus it may be difficult to carry out a wrapping operation, and also an electric wire wrapped with the tape may not curve.

The thickness of the pressure-sensitive adhesive layer 104 is preferably 5 µm to 20 µm. The thickness of the pressure-sensitive adhesive layer within such a range allows the pressure-sensitive adhesive tape to have good adhesive strength and holding force.

The thickness of the pressure-sensitive adhesive layer 104 is further preferably 5 µm to 15 µm.

EXAMPLES

The following will further describe the present invention with reference to Examples and Comparative Examples but the present invention is not limited by the following examples. Incidentally, part(s) by mass used in the blending at the time of preparation of each component means part(s) by mass of a non-volatile fraction.

Example 1

(Preparation of Main Agent)

Twenty parts by mass of a styrene-butadiene copolymer latex (T091A manufactured by JSR Corporation, non-volatile fraction: 50% by mass), 40 parts by mass of a natural rubber latex (HA latex manufactured by REGITEX K.K., non-volatile fraction: 60% by mass), and 40 parts by mass of an acryl-modified natural rubber latex (MG-40 manufactured by REGITEX K.K., non-volatile fraction: 50% by mass) were mixed to prepare 100 parts by mass of a main agent.

(Preparation of Composition for Pressure-Sensitive Adhesive)

Into 100 parts by mass of the main agent were mixed 80 parts by mass of a rosin ester resin aqueous emulsion (manufactured by Arakawa Chemical Industries, Ltd., softening point=135° C., non-volatile fraction: 50% by mass), 5 parts by mass of a polyisoprene latex (LIR700 manufactured by Kuraray Co., Ltd., weight-average molecular weight=28,000, non-volatile fraction: 50% by mass), and 2 parts by mass of a hindered phenol-based aging inhibitor, thereby preparing a composition for a pressure-sensitive adhesive.

(Preparation of Pressure-Sensitive Adhesive Resin Tape)

The above composition for a pressure-sensitive adhesive was applied on a polyvinyl chloride resin film having a thickness of 80 µm (a film using a trade name of V3001 manufactured by Riken Technos Corporation, polyvinyl chloride resin content in the film: 55 to 60% by mass) so that dry thickness became 5 µm, with a Meyer bar (a trade name: bar coater, manufactured by Dai-Ichi Rika K.K.). Then, the coated film was dried, and cured under an environment of 40° C. for 3 days, thereby preparing a pressure-sensitive adhesive resin tape.

For the obtained pressure-sensitive adhesive resin tapes, the following evaluation was performed.

Test of Adhesive Strength: In accordance with the holding force test method of JIS Z0237, a sample having a width of 15 mm and a length of 100 mm was cut off, a 30 mm-long portion of this was adhered to an SUS plate under pressure, and allowed to stand under an atmosphere of 40° C. for 60 minutes while applying a load of 550 g. The case where the sample fell down during the test period was evaluated as bad and the case where it did not fall down was evaluated as good.

Telescope phenomenon test: The case where the value of (Height of a wound tape after heating at 80° C. for 2 hours)−(Height of a wound tape before heating) was less than 1 mm was evaluated as good, the case where the value was 1 mm or more and less than 5 mm was evaluated as medium, and the case where the value was 5 mm or more was evaluated as bad.

Incidentally, the wound tape was produced by winding a pressure-sensitive adhesive tape on a machine capable of controlling winding tension.

Examples 2 to 8 and Comparative Examples 1 and 2

For Examples 2 to 8 and Comparative Examples 1 and 2, the preparation of Example 1 was repeated except that the softening point of the rosin-based tackifier resin and the thickness of the pressure-sensitive adhesive layer were changed as shown in Table 1. Incidentally, the softening points of the rosin-based tackifier resins in Examples 5 to 8 and Comparative Examples 1 and 2 were changed by varying the ratio of the acid-modification treatment.

The results are shown in Table 1.

TABLE 1

| | Main agent | Rosin-based tackifier resin | | Polyisoprene | Aging inhibitor | Thickness of pressure-sensitive adhesive layer | Pressure-sensitive | |
|---|---|---|---|---|---|---|---|---|
| | parts by mass | parts by mass | softening point | parts by mass | parts by mass | (μm) | adhesive force | Telescope |
| Example 1 | 100 | 80 | 135 | 5 | 2 | 5 | good | good |
| Example 2 | 100 | 80 | 135 | 5 | 2 | 10 | good | good |
| Example 3 | 100 | 80 | 135 | 5 | 2 | 15 | good | good |
| Example 4 | 100 | 80 | 135 | 5 | 2 | 20 | good | good |
| Example 5 | 100 | 80 | 130 | 5 | 2 | 5 | good | good |
| Example 6 | 100 | 80 | 130 | 5 | 2 | 10 | good | good |
| Example 7 | 100 | 80 | 130 | 5 | 2 | 15 | good | good |
| Example 8 | 100 | 80 | 130 | 5 | 2 | 20 | good | good |
| Comparative Example 1 | 100 | 80 | 125 | 5 | 2 | 15 | bad | medium |
| Comparative Example 2 | 100 | 80 | 120 | 5 | 2 | 15 | bad | bad |

From the results shown in Table 1, the composition for a pressure-sensitive adhesive used in each Example, which was obtained by blending 40 to 120 parts by mass of a rosin-based tackifier resin having a softening point of 130 to 135° C. and 1 to 15 parts by mass of low-molecular-weight polyisoprene having a weight-average molecular weight of 15,000 to 40,000 to 100 parts by mass (non-volatile fraction) of a main agent comprising a mixture of a natural rubber latex and a synthetic rubber latex, prevented causing the telescope phenomenon in the pressure-sensitive adhesive tape and the paste protrusion from the side of the tape and provided the tape with excellent adhesive strength.

Incidentally, the present invention is not limited to the above individual embodiments and various modified examples can be adopted within the scope of the present invention. For example, the present invention is not limited to the aforementioned embodiments, and can be subjected to appropriate modification, improvement, and the like. In addition, the material quality, shape, size, number, arranging site, and the like of each constitutional element in the aforementioned embodiments are arbitrary and are not limited as long as they can achieve the present invention.

Here, characteristics of embodiments of the aforementioned composition for the pressure-sensitive adhesive, pressure-sensitive adhesive resin tape, and wire harness according to the present invention are briefly listed in the following (1) to (5).

(1) A composition for a pressure-sensitive adhesive comprising 100 parts by mass (non-volatile fraction) of a main agent comprising a mixture of a natural rubber latex and a synthetic rubber latex, 40 to 120 parts by mass of a rosin-based tackifier resin having a softening point of 130 to 135° C. and 1 to 15 parts by mass of low-molecular-weight polyisoprene having a weight-average molecular weight of 15,000 to 40,000.

(2) A pressure-sensitive adhesive resin tape (10) comprising a pressure-sensitive adhesive layer and a resin substrate (102), wherein the pressure-sensitive adhesive layer (104) comprises the composition for a pressure-sensitive adhesive according to (1).

(3) The pressure-sensitive adhesive resin tape (10) according to (2), wherein the resin substrate (102) comprises a polyvinyl chloride resin.

(4) The pressure-sensitive adhesive resin tape (10) according to (2) or (3), wherein the pressure-sensitive adhesive layer (104) has a thickness of 5 μm to 20 μm.

(5) A wire harness comprises the pressure-sensitive adhesive resin tape (10) according to any one of (2) to (4).

What is claimed is:

1. A composition for a pressure-sensitive adhesive, comprising:
100 parts by mass (non-volatile fraction) of a main agent comprising a mixture of a natural rubber latex and a synthetic rubber latex;
60 to 100 parts by mass of a rosin-based tackifier resin having a softening point of 130 to 135° C.; and
3 to 7 parts by mass of low-molecular-weight polyisoprene having a weight-average molecular weight of 15,000 to 40,000.

2. A pressure-sensitive adhesive resin tape comprising:
a pressure-sensitive adhesive layer; and
a resin substrate,
wherein the pressure-sensitive adhesive layer comprises the composition for a pressure-sensitive adhesive according to claim 1.

3. The pressure-sensitive adhesive resin tape according to claim 2,
wherein the resin substrate comprises a polyvinyl chloride resin.

4. The pressure-sensitive adhesive resin tape according to claim 2,
wherein the pressure-sensitive adhesive layer has a thickness of 5 μm to 20 μm.

5. A wire harness comprising the pressure-sensitive adhesive resin tape according to claim 2.

* * * * *